(12) United States Patent
Saraswat et al.

(10) Patent No.: US 9,696,697 B2
(45) Date of Patent: Jul. 4, 2017

(54) AUTOMATIC SWITCHING OF HMI SCREENS BASED ON PROCESS, TASK, AND ABNORMAL DEVIATION IN A POWER PLANT

(71) Applicant: General Electric Company, Schenectady, NY (US)

(72) Inventors: Rohan Saraswat, Hyderabad (IN); Nagesh Laxminarayana Kurella, Hyderabad (IN); Karthikeyan Loganathan, Hyderabad (IN)

(73) Assignee: General Electric Company, Schenectady, NY (US)

( * ) Notice: Subject to any disclaimer, the term of this patent is extended or adjusted under 35 U.S.C. 154(b) by 839 days.

(21) Appl. No.: 14/017,862

(22) Filed: Sep. 4, 2013

(65) Prior Publication Data

US 2015/0066223 A1    Mar. 5, 2015

(51) Int. Cl.
| | | |
|---|---|---|
| *G05D 3/12* | (2006.01) | |
| *G05D 5/00* | (2006.01) | |
| *G05D 9/00* | (2006.01) | |
| *G05B 15/02* | (2006.01) | |
| *F02C 9/00* | (2006.01) | |
| *G05B 23/02* | (2006.01) | |

(52) U.S. Cl.
CPC .............. *G05B 15/02* (2013.01); *F02C 9/00* (2013.01); *F05D 2260/80* (2013.01); *G05B 23/0235* (2013.01)

(58) Field of Classification Search
CPC ....... G05B 15/02; G05B 23/0235; F02C 9/00; F05D 2260/80

USPC .......................................... 700/287–293, 17
See application file for complete search history.

(56) References Cited

U.S. PATENT DOCUMENTS

| | | | | |
|---|---|---|---|---|
| 5,748,495 | A * | 5/1998 | Arita .................... | G05B 13/028 340/3.43 |
| 6,178,393 | B1 * | 1/2001 | Irvin .................... | F04D 15/0066 700/282 |
| 7,715,929 | B2 | 5/2010 | Skourup et al. | |
| 8,127,060 | B2 * | 2/2012 | Doll ..................... | G05B 19/042 700/86 |

(Continued)

FOREIGN PATENT DOCUMENTS

EP    2418554 A1    2/2012

*Primary Examiner* — Ziaul Karim
(74) *Attorney, Agent, or Firm* — Eversheds Sutherland (US) LLP

(57) ABSTRACT

Embodiments of the disclosure relate to automatic switching of HMI (human-machine interface) screens based on process, task, and abnormal deviation in a power plant. According to one embodiment, a method is provided. The method can include monitoring one or more processes occurring during the operation of a turbine power plant in a steady state monitoring sequence, in which a plurality of overview screens are monitored, and at least one process state is determined. If the at least one process state indicates a predefined condition has occurred, at least one human interface screen can be presented to a user for troubleshooting, based at least in part on the severity of the predefined condition. If the determined process state does not indicate the predefined condition is present, and the at least one determined process state indicates an automated task sequence, the method present a sequence of preconfigured task screens to a user.

20 Claims, 6 Drawing Sheets

(56) References Cited

U.S. PATENT DOCUMENTS

| | | | | |
|---|---|---|---|---|
| 2003/0028269 A1* | 2/2003 | Spriggs | ............... | G05B 15/02 700/83 |
| 2005/0007249 A1* | 1/2005 | Eryurek | ............... | G05B 23/027 340/511 |
| 2011/0071692 A1* | 3/2011 | D'Amato | ............... | G05B 17/02 700/291 |
| 2013/0069792 A1* | 3/2013 | Blevins | ............... | G05B 17/02 340/815.4 |
| 2013/0150986 A1* | 6/2013 | Timsjo | ............... | G05B 15/02 700/83 |
| 2013/0294560 A1* | 11/2013 | Graham | ............... | G21C 17/00 376/216 |

* cited by examiner

AUTOMATIC SWITCHING OF HMI SCREENS BASED ON PROCESS, TASK, AND ABNORMAL DEVIATION IN A POWER PLANT

TECHNICAL FIELD

This disclosure relates generally to collecting machine operation data and diagnosing malfunctions, and more particularly to automatic switching of HMI (human-machine interface) screens based on process, task, and abnormal deviation in a power plant.

BACKGROUND

Safety and efficiency considerations may require that operating conditions of turbine machines for power plants, mining, oil and gas plants, and other complex machines involving turbines be continuously monitored to detect, as early as possible, indications of possible malfunctions or unwanted process deviations. Any detected malfunction indications should be presented to appropriate personnel to allow making corrective changes in operating parameters, settings, and control adjustments. In case of malfunction, personnel may need to take specific actions and make adjustments as quickly as possible to prevent serious and potentially hazardous conditions.

Most industrial processes involving the use of combustion turbine engines, such as, for example, power generation, mining, oil and gas plants, chemical plants, aircraft, locomotives, or other processes implemented by industrial drives or equipment, utilize hundreds or even thousands of sensors to obtain indications of operating conditions and parameters in real time. In one particular example of an industrial process, combustion turbine equipment in a power plant can be remotely monitored and diagnosed to improve its availability and performance. Monitored data and logs may be collected and stored at a central site for further analysis and display. The central site can utilize a number of rule-based systems to automatically detect malfunctions. Additionally, an operator at the central station can review the data to determine whether the turbine is functioning properly. Typically, the operator utilizes operation manuals and follows specific instructions to ensure proper turbine operation or completion of specific tasks. Operation manuals and instructions can be paper-based or electronic (for example, in the form of human-machine interfaces (HMIs) displayable on a display screen at the central site).

To improve the availability and operation of gas turbine processes, the earliest possible detection of unwanted conditions can be crucial. Early detection may permit appropriate action to be taken to minimize the impact of such conditions and to prevent subsequent damages. Early detection can be achieved through continuous monitoring of various operating parameters and operating conditions of the turbine and associated equipment in real-time. The operator should react very quickly and make early decisions based on established manuals or other instructions in view of currently monitored operating conditions. The requirement for early detection and action can be especially important when deterioration of equipment can happen in relatively short periods of time, which, if left unchecked, can have significant impact on the performance of the turbine and related equipment.

BRIEF DESCRIPTION OF THE DISCLOSURE

The present disclosure relates to automatic switching of HMI screens based on process, task, and abnormal deviation in a power plant. In certain embodiments, methods and systems for managing operation of a power plant can be provided. According to one embodiment, a method can be provided. The method can include monitoring one or more processes occurring during the operation of a turbine power plant in a steady state monitoring sequence, in which a plurality of overview screens are monitored, and at least one process state is determined. In an example, if the at least one process state indicates that a predefined condition has occurred, at least one human interface screen can be presented to a user for troubleshooting, based at least in part on the severity of the predefined condition. The at least one human machine interface screen may convey information related to an operational status of components of the turbine power plant. Furthermore, the at least one human machine interface screen may present operational controls to a user to take control of the one or more monitored processes. In an example, if the determined process state does not indicate that the predefined condition is present, and the at least one determined process state indicates an automated task sequence, the method can proceed with presenting a sequence of preconfigured task screens to a user.

In one embodiment, a control system can be provided. The control system can include a monitoring system for monitoring one or more processes occurring during the operation of a turbine power plant in a steady state monitoring sequence, in which a plurality of overview screens are monitored and at least one process state is determined. The control system can further include a human interface system configured to output at least one human machine interface (HMI) screen to a user for troubleshooting if the determined process state indicates that a predefined condition is present, based at least in part on the severity of the detected predefined condition.

The at least one HMI screen may convey information related to the operational status of components of the turbine power plant, and the at least one HMI screen may present operational controls to a user to take control of the one or more monitored processes. The human interface system is further configured to output a sequence of pre-configured task screens to a user if the determined process state indicates that a predefined condition is not present and if the determined process state indicates an automated task sequence.

Other embodiments and aspects will become apparent from the following description taken in conjunction with the following drawings.

DETAILED DESCRIPTION

Figure 1:
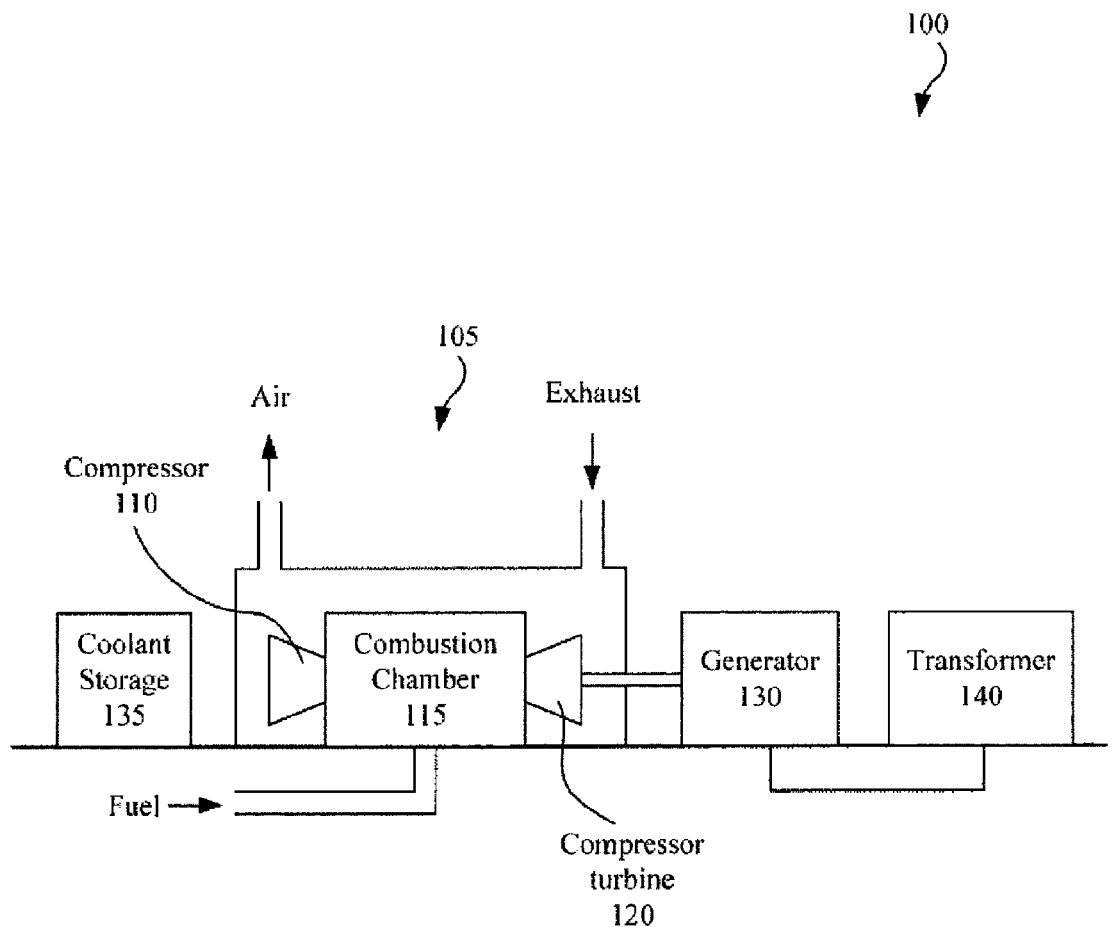
FIG. 1 shows a block diagram of a power plant including a combustion turbine, in accordance with one or more example embodiments of the disclosure.

The embodiments described herein relate to methods and systems for managing operation of a power plant utilizing, for example, a combustion turbine or engine. It should be understood, however, that the power plant described herein is an example, and the scope, aspects, embodiments, and concepts described herein may be successfully applied to a wide range of equipment including, for example, oil and gas plants, mining plants, chemical plants, processing manufacturers, aircrafts, various vehicles utilizing complex machines (such as turbines), and many more. All of these examples, their derivatives, associated systems and apparatuses, and analogues are within the spirit and scope of the present disclosure.

Certain embodiments of the present disclosure provide for a specific HMI enabling intelligent control of the operating conditions and related parameters of the power plant. The HMI may include multiple graphical user interfaces (GUIs), which are referred to herein as "HMI screens," that can be presented to an operator of the power plant. The HMI screens may convey information related to parameters and conditions associated with a plurality of various devices of the power plant. These devices may relate to various sensors, detectors, measurement apparatuses, valves, control circuits, pumps, switches, and so forth. In operation of the power plant, the HMI screens may be automatically switched from one HMI screen to another based on the current task, process, or unwanted deviations in processes occurring in the power plant.

According to various embodiments, there is provided a control system which may monitor the operation of the power plant and initiate certain processes or tasks based thereupon and/or predefined rules. The control system may notify the HMI regarding the current task or process and supply certain information regarding the current operation of the power plant, which may include values of various parameters, for example. In certain embodiments, however, the control system may merely supply measured data, while the HMI detects the task and current process of the power plant.

Certain power plant tasks or processes may require monitoring of specific parameters and operating conditions, and therefore the HMI may continuously display only those parameters, operating conditions, and control widgets that are specifically required for a given task or process as initiated or supervised by the control system. In certain embodiments, the monitoring of these parameters may include object linking and embedding (OLE) for object process control (OPC) communication schemes.

In operation, once the HMI acquires parameter values from the control system and determines the start of a certain task or operation mode of the power plant, the HMI may map the determined task (process) to a related HMI screen in a database. After the mapping, the desired HMI screen can be presented to the operator of the power plant. Furthermore, this HMI screen may provide important information regarding currently measured parameters and operating conditions, as well as controls, all of which are specific to the determined task or operation mode. The monitored power plant tasks and modes may relate to a wide range of processes, which may include, but are not limited to, a plant start-up process, shutdown process, runback process, steady state process, start check process, equipment failure process, abnormal deviation or alarm, and so forth.

Accordingly, there is no need for the operator to manually set up a desired graphical interface or manually search for parameters to be controlled, and there is no need to manually search for controls or actions to be taken by the operator for a specific task or operation mode. Instead, the present technology may intelligently and automatically direct the operator to required HMI screen(s) in an effort to enable him to quickly evaluate the current conditions of the plant and make early decision(s) based thereupon.

In certain embodiments, a number of HMI screens may be required for displaying to the operator. The HMI screens can be ranked based on predetermined rules such as a priority list, time factor, and so forth, and then presented to the operator in a sequential manner based on the predefined rank, priority, or other criteria/rules. This approach may be helpful when hardware adjustments take place at the power plant, making it necessary to perform certain tasks prior to the power plant being brought into a steady mode. The hardware changes may be automatically determined by detecting, for example, a particular process, which may lead to showing certain HMI screens to the operator to help the operator with performing required procedures.

The technical effects of embodiments of the present disclosure may include improving and enhancing the productivity of operators, and, consequently, the productivity of a power plant. Further technical effects may include enabling early detection of malfunctions, abnormal conditions, and process deviations, thereby preventing failures, tripping, and shutdown of the power plant or associated equipment. Yet other technical effects may include reducing cycle time to analyze and determine causes of failures or malfunctions with respect to equipment of the power plant.

Referring now to the drawings, FIG. 1 shows a block diagram of an example power plant 100 including a combustion turbine. In particular, the shown power plant 100 includes a turboshaft engine 105, which is a type of traditional gas turbine optimized to produce shaft power for power generation. The turboshaft engine 105 has a compressor 110, which may intake outside air and then compress and inject the air into a combustion chamber 115, where the compressed air is mixed with fuel gas and ignited. The ignited air-gas mixture forces a compressor turbine 120 to rotate a shaft 125, and output exhaust outside. The rotational motion of the shaft 125 is delivered to a generator 130, which transforms the rotational motion into electricity. The power plant 100 may also include a number of various additional devices, systems, and equipment such as coolant storage 135, a transformer 140, power lines, measuring devices, pumps, electromechanical valves, detectors, triggers, and so forth. It should be also clear to those skilled in the art that the power plant 100 may run various processes or operation modes. Some of the processes and operation modes, which can be monitored, include a process that operates the flow of fuel to the turbine power plant 100, a process that operates coolant storage 135, a process that operates air intake into a combustion chamber 115, a process that operates a compressor 110 connected to a combustion chamber 115, a process that operates a combustion chamber 115, a process that operates a compressor turbine 120, a process that operates an exhaust flow of combusted fuel, a process that operates a generator 130 connected to a compressor turbine 120, a process that operates a transformer connected to a generator 130, and so forth.

Figure 2:
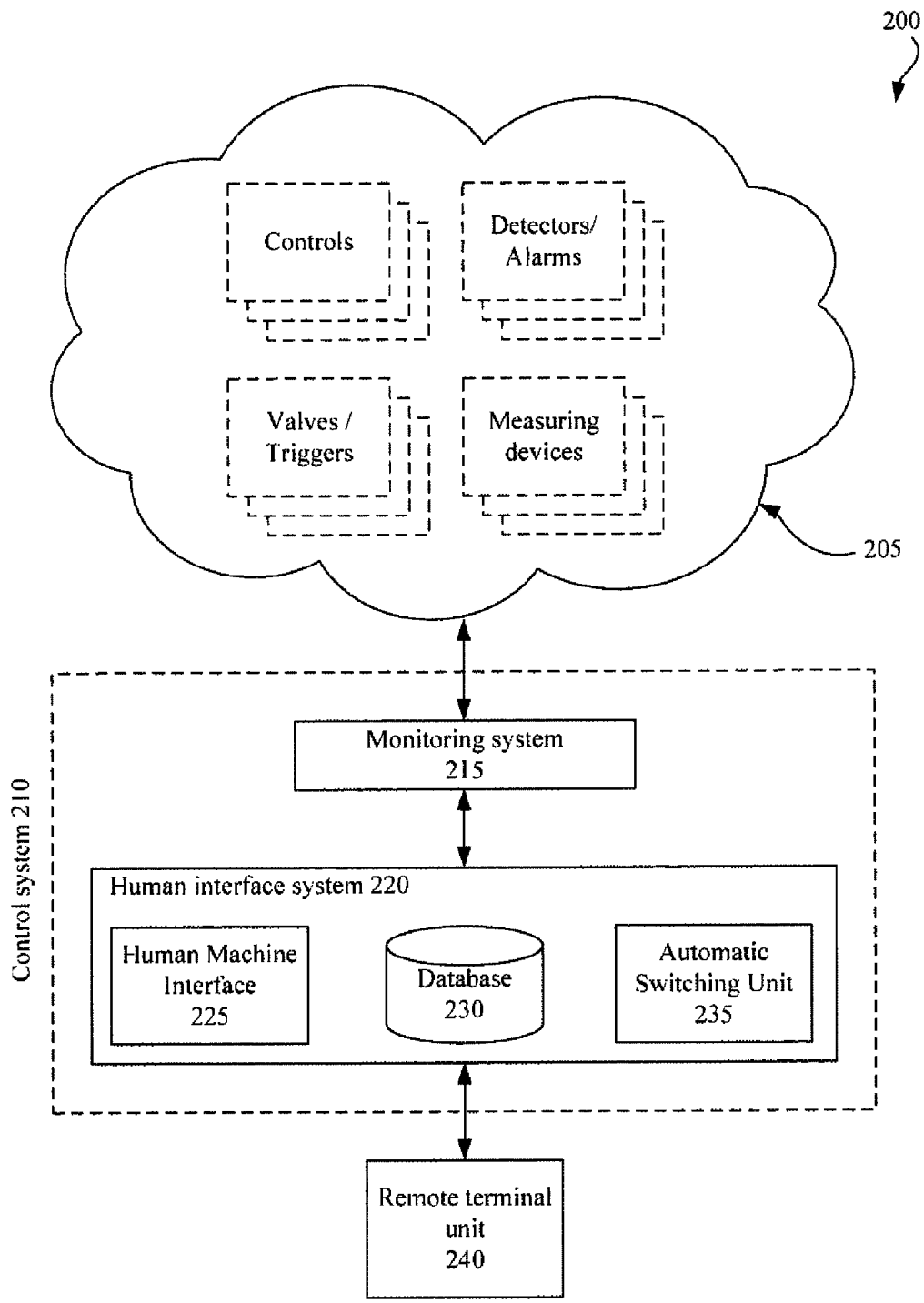
FIG. 2 illustrates a system environment suitable for implementing methods for monitoring and managing operation of a power plant, in accordance with one or more example embodiments of the disclosure.

FIG. 2 illustrates a system environment 200 suitable for implementing methods for managing operation of a power plant 100, in accordance with one or more example embodiments. The system environment 200 may include a number of power plant related devices 205 that can be selected from a wide range of measuring devices, detectors, alarms, controllers, control circuits, pumps, electromechanical valves, and so forth. The system environment 200 may further include a control system 210, which may be operatively connected to the power plant related devices 205. The control system 210 may aggregate measured values of multiple measuring devices and detectors, as well as generate and transmit commands to controllers, control circuits, pumps, electromechanical valves, and so forth. The control system 210 may include hardware and/or software components and may run dedicated software enabling the power plant 100 to operate in a desired mode or run specific processes.

In certain embodiments, the control system 210 may include a monitoring system 215 configured to monitor one or more processes occurring during the operation of the power plant 100 and determine current processes, process states, aggregate measured parameters, and so forth. Furthermore, the control system 210 may include a human interface system 220. The human interface system 220 may include an HMI 225 configured to generate HMI screens based at least in part on one or more of the following: a current task or process running on the power plant 100, measured parameters, or determined operating conditions.

Still referring to FIG. 2, the human interface system 220 may include a database 230 which may store a plurality of HMI screens and associated information. The HMI screens stored in the database 230 may be virtually linked with various tasks or processes that can be run by the power plant 100 or related devices. Furthermore, the human interface system 220 may include an automatic switching unit (ASU) 235 for automatically switching HMI screens displayed to the operator based on predetermined criteria.

In certain embodiments, the HMI screens can be switched from one screen to another by following specific stages of a certain process (task, operation mode) or based at least in part on measured values of various parameters. For example, a start-up process for the power plant 100 may include multiple stages requiring the operator to monitor various parameters (specific for each stage) and control certain devices (also specific to each stage). Accordingly, the ASU 235 may intelligently switch HMI screens for the operator and focus his attention only on those parameters and controls that are required or important at a given process stage.

The control system 210 may be also in communication with a remote terminal unit (RTU) 240, which may be located at a remote site and be accessible for the operator. The RTU 240 may include dedicated software and/or hardware components for displaying HMI screens and to receive an operator's input such as commands or instructions to certain devices (e.g., electromechanical valves) of the power plant 100. It should be clear, however, that the RTU 240 and control system 210 may be embedded in a single unit. Further, it should be clear that some elements of the control system 210 may reside at the RTU 240, and vice versa. FIG. 2 shows just one example implementation and the aspects of the present disclosure are not limited to the illustrated embodiment.

Figure 3:
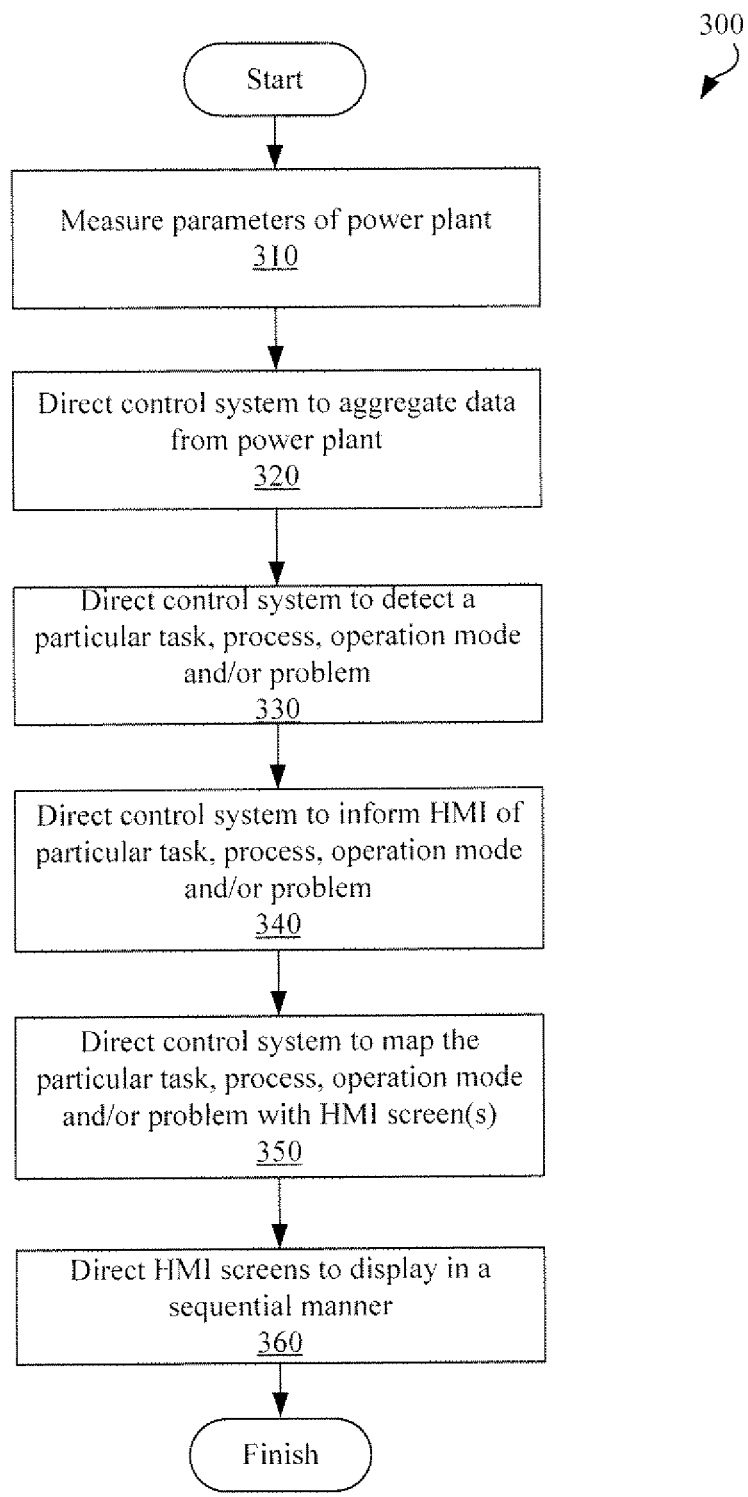
FIG. 3 is a process flow diagram showing a method for monitoring operation of a power plant, in accordance with one or more example embodiments of the disclosure.

FIG. 3 is a process flow diagram showing an example method 300 for monitoring operation of the power plant 100. The method 300 may be performed by processing logic that may comprise hardware (e.g., dedicated logic, programmable logic, and microcode), software (such as software run on a general-purpose computer system or a dedicated machine), or a combination of both. The method 300 can be performed by the units, devices, or systems discussed above with reference to FIG. 2. Each of these units, devices, or systems may comprise processing logic. It will be appreciated by one of ordinary skill in the art that examples of the foregoing units, devices, or systems may be virtual, and instructions said to be executed by units, devices, or systems may in fact be retrieved and executed by a processor. The foregoing units, devices, or systems may also include a memory for storing instructions and related code. Although various modules may be configured to perform some or all of the various steps described herein, fewer or more units may be provided and still fall within the scope of example embodiments.

As shown in FIG. 3, the method 300 may commence at operation 310 with measuring various parameters at the power plant 100. These parameters may include, for example, an operational temperature of a power plant component, a resistance in an electrical component of the power plant 100, pressure in a power plant component, a voltage in an electrical component of the power plant 100, a current value related to an electrical component of the power plant 100, and so forth. In certain embodiments, at the operation 310, one or more alarms or alerts can be generated in response to a change in parameter values (e.g., temperature, pressure, velocity, voltage, current, resistance, etc.).

At operation 320, the control system 210 may aggregate data from the power plant 100. The data in this case may include the aforementioned measured parameters, alarms, alerts, and/or related information.

At operation 330, the monitoring system 215 of the control system 210 may run proprietary algorithms to detect a current task performed or to be performed by the power plant 100, or current process, operating mode, or problem occurring in the power plant. If the determined task or process includes a plurality of sub-tasks or sub-processes, these sub-tasks or sub-processes may be ranked and prioritized (e.g., sorted by a priority rank).

At operation 340, the monitoring system 215 may inform the HMI 225 of the detected task(s), process(es), or process state(s). At operation 350, the HMI 225 may map the determined task (process, process step) in the database 230 to a plurality of HMI screens. As a result, one or more HMI screens relevant for the determined task (process, process step) may be located.

At operation 360, the located HMI screens may be displayed in a sequential manner based at least in part on the determined task (process, process step) and/or established priority. In other words, the ASU 235 may monitor the process flow and switch HMI screens from one screen to another based on the current step or stage. Accordingly, the operator does not need to manually navigate through hundreds of HMI screens and may focus on the current power plant operation instead.

Figure 4:
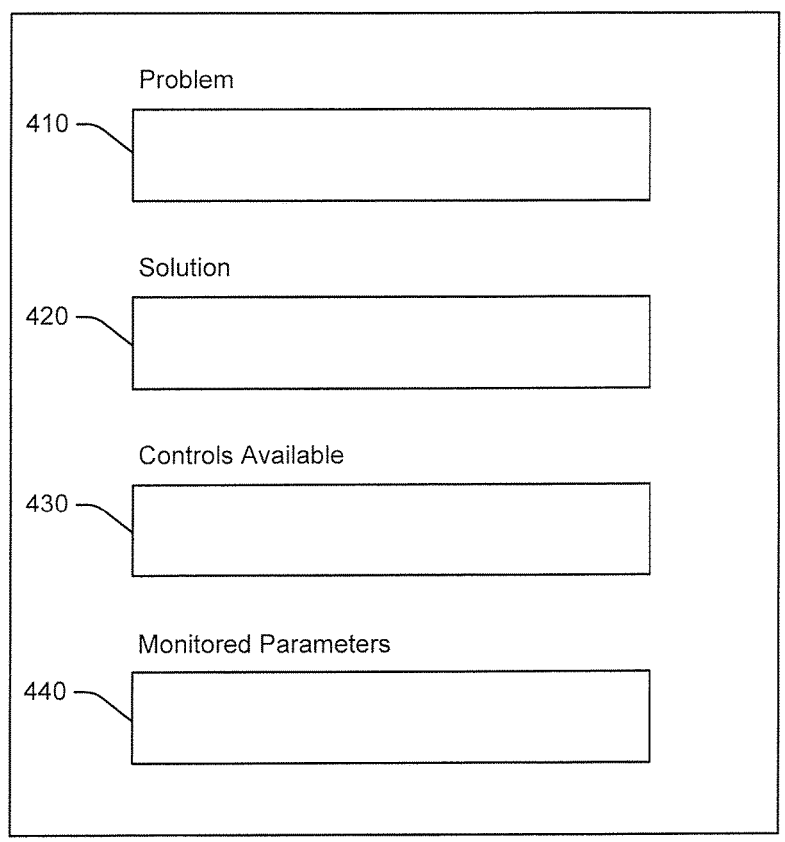
FIG. 4 is a schematic diagram of an HMI screen, in accordance with one or more example embodiments of the disclosure.

FIG. 4 is a schematic diagram of an HMI screen 400 displayable at the RTU 240, in accordance with an example embodiment. This exemplary HMI screen 400 can be displayed on a display screen of any suitable computing device including, for example, a desktop computer, laptop computer, tablet computer, smartphone, Television (TV) display, or any other suitable device.

In the example embodiment, the HMI screen 400 may include a widget 410 for displaying a current problem, task, or process. The HMI screen 400 may optionally include a widget 420 for displaying a possible solution to the determined problem, or specific rules/instructions with respect to the determined task or process.

The HMI screen 400 may include a widget 430 for enabling the operator to control various devices of the power plant 100 such as electromechanical valves, voltage/current regulators, switches, and so forth. Furthermore, the HMI screen 400 may include a widget 440 for displaying specific measured parameters or related information. It should be understood that among all measured parameters, only those that are relevant to a given step or process are displayed. Similarly, controls available for the operator at the widget 430 are only those that are relevant to a given task or process.

Figure 5:
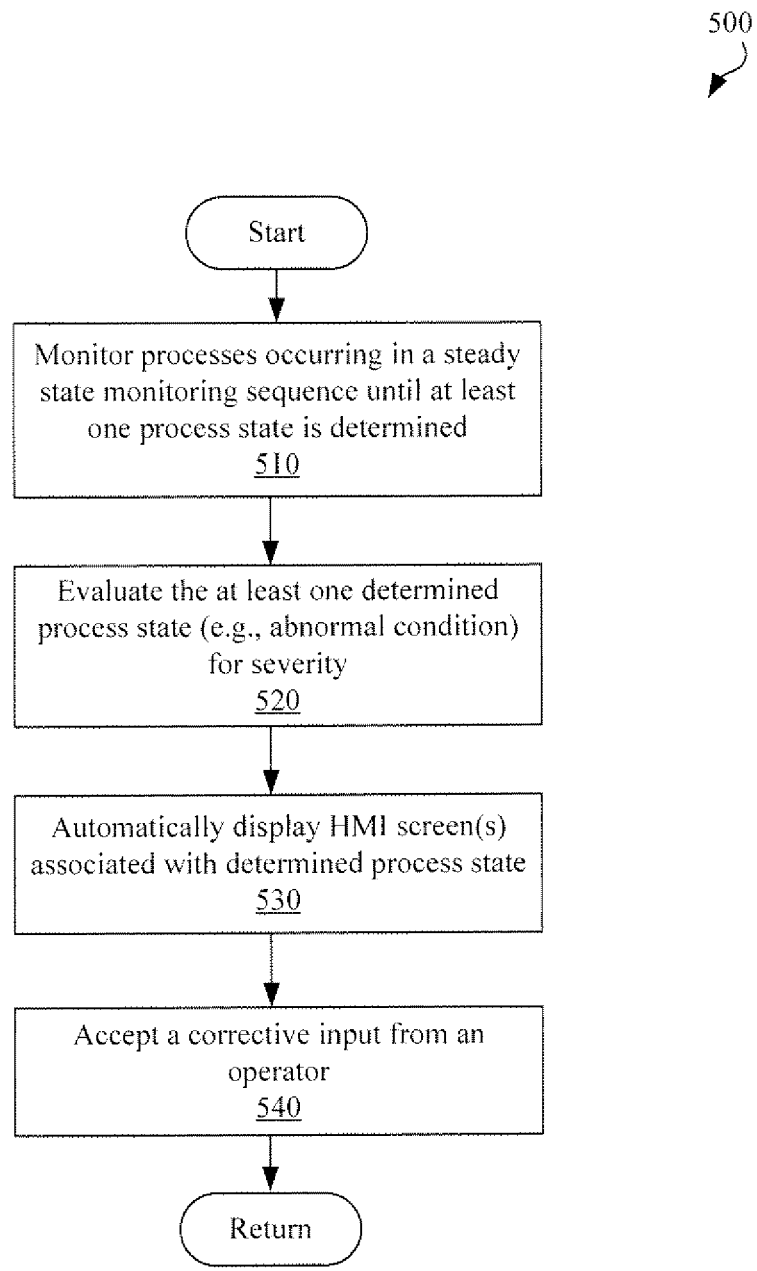
FIG. 5 is a process flow diagram showing a method for managing operation of the power plant, in accordance with one or more example embodiments of the disclosure.

FIG. 5 is a process flow diagram showing an example method 500 for managing operation of the power plant 100. The method 500 may be performed by processing logic that may comprise hardware (e.g., dedicated logic, programmable logic, and microcode), software (such as software run on a general-purpose computer system or a dedicated machine), or a combination of both. The method 500 can be performed by the units, devices, or systems discussed above with reference to FIG. 2. Each of these units, devices, or systems may comprise processing logic. It will be appreciated by one of ordinary skill in the art that examples of the foregoing units, devices, or systems may be virtual, and instructions said to be executed by units, devices, or systems may in fact be retrieved and executed by a processor. The foregoing units, devices, or systems may also include memory for storing instructions and related code. Although various modules may be configured to perform some or all of the various steps described herein, fewer or more units may be provided and still fall within the scope of example embodiments.

At operation 510, the monitoring system 215 may monitor one or more processes occurring during the operation of power plant 100 in a steady state monitoring sequence (in which a plurality of overview HMI screens are monitored and optionally displayed). The operation of power plant 100 may be monitored until at least one process state is determined. In certain embodiments, the determined process state may include an abnormal condition, malfunction, or problem.

At operation 520, the human interface system 220 may evaluate the determined process state (e.g., abnormal condition) for severity. The severity of the process state may be determined by a prediction of a predefined condition or process state based on the determined process state. In certain embodiments, the prediction of a predefined condition can be made based at least in part on one or more of the following: a detected operational temperature of a component (e.g., if it is above a predefined value), a change in resistance of an electrical component, a change in voltage of an electrical component, a change in current flowing in an electrical component, a change in pressure (e.g., air pressure, fuel pressure) of a particular component, and so forth.

At operation 530, the human interface system 220 may automatically display, to an operator, one or more HMI screens that are associated with a determined process state (identified task, problem or process). In case the HMI screen is addressing an identified problem in the operation of a power plant, one or more solution approaches may be also presented to the operator. As discussed above, the HMI screen(s) may convey information related to the operational status of components of the power plant 100, and the HMI screen(s) may include operational controls to enable the operator to take control of the one or more monitored processes.

At operation 540, the human interface system 220 may optionally accept a correction input from the operator, which may include adjustments, settings, changes, or regulation of certain processes occurring in the power plant 100 or related devices 205. For example, the operator may control dedicated valves and pumps, adjust a velocity of supplying air or rotational speeds, and the like. At operation 540, the operator's input can be accepted and transmitted to the power plant 100 or associated equipment for implementation.

It should be noted that, at the operations 510 and 520, no abnormal processes may be determined or detected. Instead, the at least one determined process state may indicate an automated task sequence. If this is the case, the human interface system 220 may merely output a sequence of preconfigured task HMI screens to the operator. The HMI screens do not include any information related to identified problems or alarms.

At operations 510 and 520, a cooling water pump alarm may be identified indicating an abnormality in operation of the coolant storage 135. Furthermore, at operation 530 and in response to the identification of a cooling water pump alarm, the human interface system 220 can provide, to the operator, a cooling water HMI screen. The cooling water HMI screen may include a widget showing a status of a standby cooling water pump. Furthermore, the operator may provide commands based on the information provided in the cooling water HMI screen and established procedures, and, in response to the operator's input, the standby cooling water pump may be activated. Once the problem is resolved, the control system 210 may acknowledge and reset the cooling water pump alarm.

In another example scenario of the method 500, at operations 510 and 520, an automated task sequence can be detected (or determined) by the control system 210. In response to this detection, the human interface system 220 may display a start check HMI screen. Once the start check HMI screen is displayed, the control system 210 may initiate the automated task sequence from the start check HMI screen.

In yet another example scenario of the method 500, at operations 510 and 520, two or more processes executed in synch can be identified by the control system 210. In response to the identification, the human interface system 220 may display one or more specific synchronization HMI screens. Once the synchronization HMI screen(s) is(are) displayed, the control system 210 may initiate a synchronization process between two or more processes so that the process can be monitored by the operator.

Figure 6:
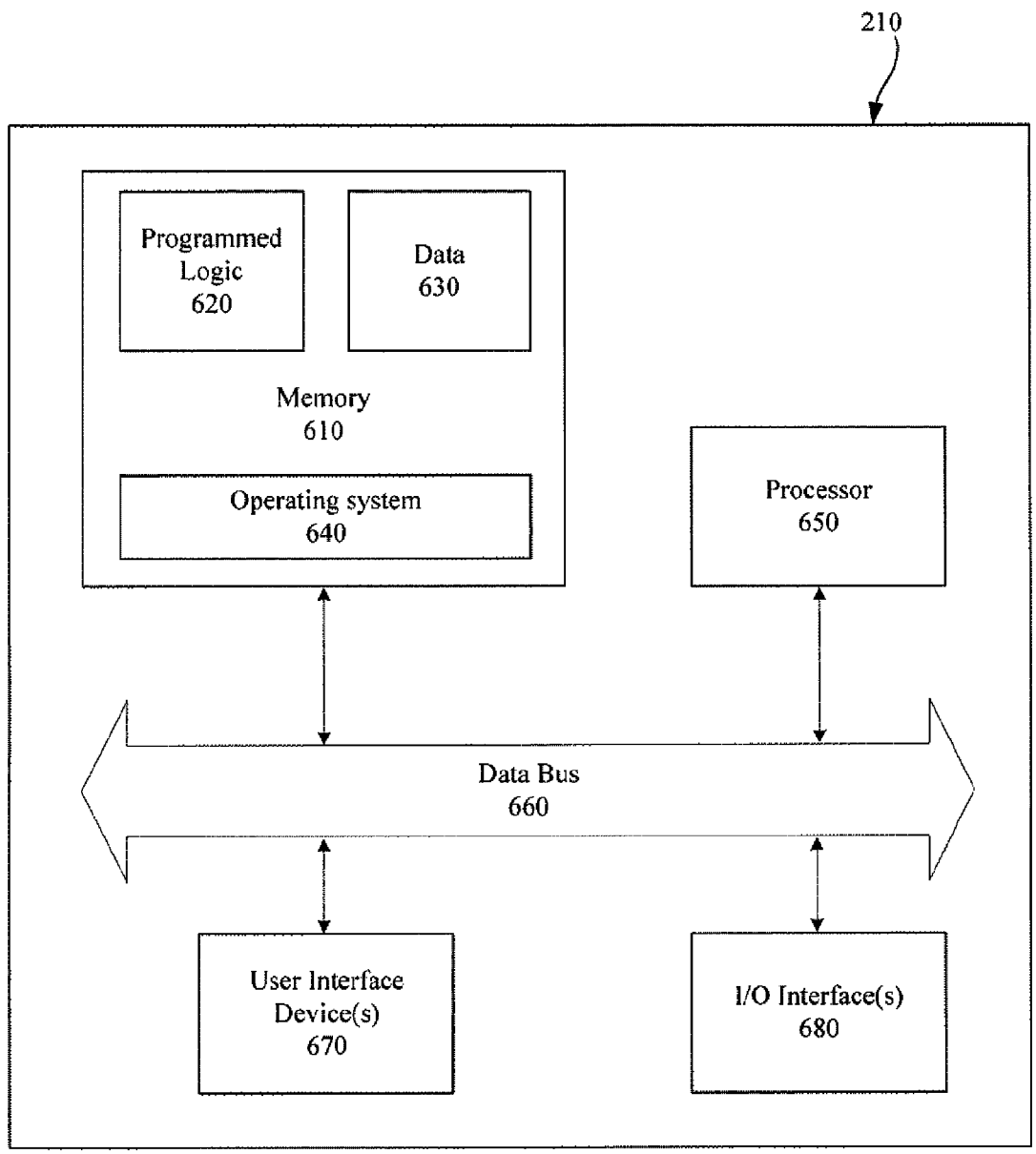
FIG. 6 depicts a block diagram illustrating a control system, in accordance with one or more example embodiments of the disclosure.

FIG. 6 depicts a block diagram illustrating a control system 210, in accordance with an embodiment of the disclosure. More specifically, the elements of the control system 210 may be used to monitor and manage operation of the power plant 100, its equipment and associated devices, or any other similar complex plant involving, for example, combustion turbines or engines. The control system 210 may include a memory 610 that stores programmed logic 620 (e.g., software) and may store data 630, such as HMI screens, instructions, criteria, widgets, and the like. The memory 610 also may include an operating system 640. A processor 650 may utilize the operating system 640 to execute the programmed logic 620, and in doing so, may also utilize the data 630. A data bus 660 may provide communication between the memory 610 and the processor 650. Users may interface with the control system 210 via at least one user interface device 670 such as a keyboard, mouse, touchscreen, control panel, or any other device capable of communicating data to and from the control system 210. The control system 210 may be in communication with the power plant and its associated devices online while operating, as well as in communication with the power plant and its associated devices offline while not operating, via an input/output (I/O) interface 680. More specifically, the control system 210 may carry out the execution of model-based instructions for, but not limited to, command signals to certain devices of the power plant 100 and/or its associated devices, monitor measured parameters and alarms from the power plant 100 and its associated devices, and do any other action as described above with reference to FIG. 5. In the illustrated embodiment, the control system 210 may be located remotely with respect to the power plant 100, although it may be co-located or even integrated with the power plant 100. Further, the control system 210 and the programmed logic 620 implemented thereby may include software, hardware, firmware, or any combination thereof. It should also be appreciated that multiple controllers or processors may be used in the control system 210, whereby different features described herein may be executed on one or more different controllers or processors.

Accordingly, embodiments described herein allow for intelligent monitoring and managing of operations of the power plant 100 and/or associated devices and systems. The use of preconfigured and dedicated HMI screens, which are automatically presented to an operator based on determined task(s), process(es) or operating mode(s), is a great advantage and help for the operator to identify malfunctions and abnormal operations and to react early by making appropriate adjustments. HMI screens may be switched from one to another in the course of solving identified problems or in the course of multistage operation. There is no need for the operators to manually navigate through bulky manuals or search for required graphical interfaces, which saves a critically important amount of time.

References are made to block diagrams of systems, methods, apparatuses, and computer program products according to example embodiments. It will be understood that at least some of the blocks of the block diagrams, and combinations of blocks in the block diagrams, respectively, may be implemented at least partially by computer program instructions. These computer program instructions may be loaded onto a general purpose computer, special purpose computer, special purpose hardware-based computer, or other programmable data processing apparatus to produce a machine, such that the instructions, which execute on the computer or other programmable data processing apparatus, create means for implementing the functionality of at least some of the blocks of the block diagrams, or combinations of blocks in the block diagrams discussed.

The computer program instructions mentioned herein may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process, such that the instructions that execute on the computer or other programmable apparatus provide steps for implementing the functions specified in the block or blocks.

One or more components of the systems and one or more elements of the methods described herein may be implemented through an application program running on an operating system of a computer. They also may be practiced with other computer system configurations, including handheld devices, multiprocessor systems, microprocessor based or programmable consumer electronics, mini-computers, mainframe computers, and so forth.

Application programs that are components of the systems and methods described herein may include routines, programs, components, data structures, and so forth that implement certain abstract data types and perform certain tasks or actions. In a distributed computing environment, the application program (in whole or in part) may be located in local memory or in other storage. In addition, or in the alternative, the application program (in whole or in part) may be located in remote memory or in storage to allow for circumstances where tasks are performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated the disclosure may be embodied in many forms and should not be limited to the example embodiments described above. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of managing operation of a power plant, comprising: monitoring, by a controller, via a plurality of sensors operable to sense parameters associated with one or more processes, the one or more processes occurring during the operation of a turbine power plant in a steady state monitoring sequence in which a plurality of overview screens are monitored and at least one process state is determined;

if the at least one determined process state indicates a predefined condition is present, then at least one human interface screen is output to a user for troubleshooting, based at least in part on severity of the predefined condition, the at least one human machine interface screen conveying information related to operational status of components of the turbine power plant, the at least one human machine interface screen comprising operational controls to allow a user to take control of the one or more monitored processes; and if the determined process state does not indicate the predefined condition is present, and if the at least one determined process state indicates an automated task sequence, then outputting a sequence of preconfigured task screens to a user, wherein the automated task sequence includes at least one task performed by the turbine power plant, the at least one task including a plurality of sub-tasks being performed by the turbine power plant, each sub-task being associated with a human machine interface task screen, wherein the outputting the sequence of preconfigured task screens includes outputting a plurality of human machine interface task screens, each human machine interface task screen being output in a sequential manner based at least on a predefined rank associated with each of the plurality of sub-tasks.

2. The method of claim 1, wherein the one or more monitored processes comprise at least one of: a process that operates a flow of fuel to the turbine power plant, a process that operates coolant storage, a process that operates air intake into a combustion chamber, a process that operates a compressor connected to a combustion chamber, a process that operates a combustion chamber, a process that operates a turbine, a process that operates exhaust flow of combusted fuel, a process that operates a generator connected to a turbine, or a process that operates a transformer connected to a generator.

3. The method of claim 1, wherein the severity of the predefined condition is determined by a prediction based on detected the predefined condition.

4. The method of claim 3, wherein the prediction of the predefined condition is made based at least in part on a detected operational temperature of a component or a detected change in resistance in an electrical component.

5. The method of claim 4, wherein the prediction of the predefined condition is made based at least in part on a detected change in resistance in an electrical component.

6. The method of claim 1, further comprising, upon detecting the predefined condition, detecting a cooling water pump alarm.

7. The method of claim 6, further comprising opening a cooling water human interface screen.

8. The method of claim 7, wherein the cooling water human interface screen comprises status of a standby cooling water pump.

9. The method of claim 8, further comprising activating the standby cooling water pump.

10. The method of claim 9, further comprising acknowledging and resetting the cooling water pump alarm.

11. The method of claim 1, further comprising:
upon detecting an automated task sequence, opening a start check human interface screen.

12. The method of claim 11, further comprising initiating an automated task sequence from the start check human interface screen.

13. The method of claim 1, further comprising:
opening a synchronization human interface screen and initiating a synchronization process between two or more processes.

14. A control system for operating a combustion turbine power plant, comprising:
a monitoring system comprising a controller and a plurality of sensors operable to sense parameters associated with one or more processes for monitoring the one or more processes occurring during operation of a turbine power plant in a steady state monitoring sequence in which a plurality of overview screens are monitored and at least one process state is determined;
a human interface system configured to, if the determined process state indicates a predefined condition is present, output at least one human interface screen to a user for troubleshooting, based at least in part on a severity of the predefined condition, the at least one human machine interface screen conveying information related to operational status of components of the turbine power plant, the at least one human machine interface screen presenting operational controls to allow a user to take control of the one or more monitored processes; and
if the determined process state does not indicate the predefined condition present, and if the determined process state indicates an automated task sequence, then output a sequence of pre-configured task screens to a user, wherein the automated task sequence includes at least one task performed by the turbine power plant the at least one task including a plurality of sub-tasks being performed by the turbine power plant each sub-task being associated with a human machine interface task screen, wherein the output of the pre-configured sequence of task screens includes output of a plurality of human machine interface task screens, each human machine interface task screen being output in a sequential manner based at least on a predefined rank associated with each of the plurality of sub-tasks.

15. The control system of claim 14, wherein the display screen conveys an indication of the predefined condition prediction for at least one component.

16. The control system of claim 15, wherein the predefined condition prediction is based on operating temperature of a component or resistance in a component.

17. The control system of claim 15, wherein the component comprises a cooling water pump.

18. One or more non-transitory computer-readable media containing instructions which, when executed by a processor, indicate detection of a predefined condition occurring in the operation of a turbine power plant by performing the operations of:
monitoring, by a controller, via a plurality of sensors operable to sense parameters associated with one or more processes, the one or more processes occurring during the operation of the turbine power plant in a steady state monitoring sequence in which at least one overview screen is monitored and at least one process state is determined;
if the determined process state indicates the predefined condition present, then outputting at least one human interface screen to a user for troubleshooting, based at least in part on a severity of the predefined condition, the at least one human machine interface screen conveying information related to operational status of components of the turbine power plant, the at least one human machine interface screen presenting operational controls to allow a user to take control of the one or more monitored processes; and
if the determined process state does not indicate the predefined condition is present, and if the determined process state indicates an automated task sequence, then outputting a sequence of preconfigured task screens to a user, wherein the automated task sequence includes at least one task performed by the turbine power plant the at least one task including a plurality of sub-tasks being performed by the turbine power plant each sub-task being associated with a human machine interface task screen, wherein the outputting the pre-configured sequence of task screens includes outputting a plurality of human machine interface task screens, each human machine interface task screen being output in a sequential manner based at least on a predefined rank associated with each of the plurality of sub-tasks.

19. The non-transitory computer-readable media of claim 18, wherein severity of the predefined condition is determined by heat or resistance detected in a component in the plurality.

20. The non-transitory computer-readable media of claim 19, wherein the component comprises a cooling water pump.

* * * * *